United States Patent [19]

Paley

[11] Patent Number: 5,506,605
[45] Date of Patent: * Apr. 9, 1996

[54] THREE-DIMENSIONAL MOUSE WITH TACTILE FEEDBACK

[76] Inventor: W. Bradford Paley, 170 Claremont Ave. Ste. 6, New York, N.Y. 10027

[ * ] Notice: The portion of the term of this patent subsequent to Mar. 22, 2011, has been disclaimed.

[21] Appl. No.: 187,608

[22] Filed: Jan. 26, 1994

Related U.S. Application Data

[63] Continuation of Ser. No. 919,931, Jul. 27, 1992, Pat. No. 5,296,871.

[51] Int. Cl.$^6$ .................................................... G09G 3/02
[52] U.S. Cl. .................. 345/163; 345/158; 340/407.2
[58] Field of Search ................................ 345/156, 157, 345/158, 160, 163, 166, 168; 74/471 XY; 200/6 A, 61.85, 322.22; 273/438; 341/34, 27; 340/407.2, 407.1

[56] References Cited

U.S. PATENT DOCUMENTS

| | | | |
|---|---|---|---|
| 3,919,691 | 11/1975 | Noll | 364/916 |
| 4,313,113 | 1/1982 | Thornburg | 345/159 |
| 4,489,316 | 12/1984 | MacQuivey | 364/409 |
| 4,501,424 | 2/1985 | Stone | 200/6 A |
| 4,509,383 | 4/1985 | Yeh | 74/47 X |
| 4,560,983 | 12/1985 | Williams | 340/825 |
| 4,578,674 | 3/1986 | Baker et al. | 345/159 |
| 4,739,128 | 4/1988 | Grisham | 200/6 A |
| 4,795,296 | 1/1989 | Jau | 74/523 |
| 4,839,838 | 6/1989 | La Biche | 345/157 |
| 4,868,549 | 9/1989 | Affinito | 345/164 |
| 4,905,001 | 2/1990 | Penner | 341/20 |
| 4,988,981 | 1/1991 | Zimmerman et al. | 345/158 |
| 5,006,836 | 4/1991 | Cooper | 345/163 |
| 5,027,115 | 6/1991 | Sato et al. | 341/13 |
| 5,038,142 | 8/1991 | Flowers et al. | 341/34 |
| 5,073,685 | 12/1991 | Kobayashi et al. | 178/18 |
| 5,095,303 | 3/1992 | Clark | 345/164 |
| 5,175,534 | 12/1992 | Thatcher | 345/156 |
| 5,329,276 | 7/1994 | Hirbayashi | 345/157 |

FOREIGN PATENT DOCUMENTS

| | | |
|---|---|---|
| 0179821 | 9/1985 | Japan . |
| 2244546 | 12/1991 | United Kingdom . |

OTHER PUBLICATIONS

Sensors 1992 Buyers Guide, pp. 3–4.
Polhemus Price List, 3 space Fastrak, Jun. 23, 1992.
Polhemus Price List, 3 space Isatrak, Jun. 9, 1992.
Ascension Technology Corp., The Bird 6D Input Device.
Interlink Electronics, Force Sensing Resistors, Standard Parts Price List & Order Form.
Logitech, Inc. Logitech's 2D/6D mouse, Jul. 25, 1991.

Primary Examiner—Richard Hjerpe
Assistant Examiner—Lun-Yi Lao
Attorney, Agent, or Firm—Basile and Hanlon

[57] ABSTRACT

A three-dimensional mouse is disclosed for interfacing with a central processing unit. The mouse comprises a hand-held housing adapted to be used in free space. The housing has a generally vertical orientation relative to the user. A mechanism, mounted in the housing, is provided for locating the mouse with respect to at least one of spatial dimension and orientational dimension, which locating mechanism includes a mechanism for transmitting the location to a central processing unit.

12 Claims, 1 Drawing Sheet

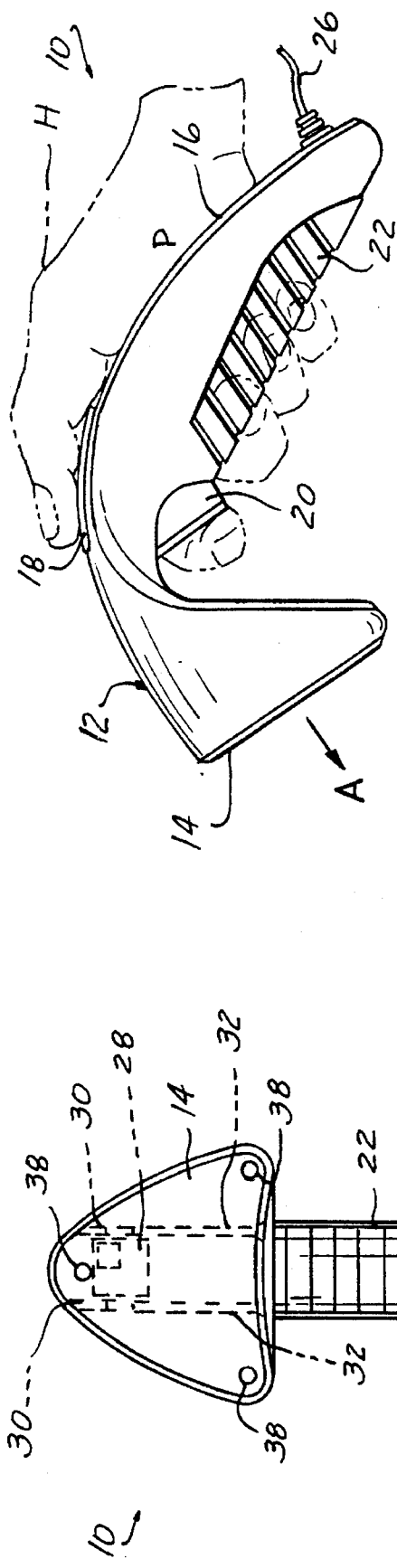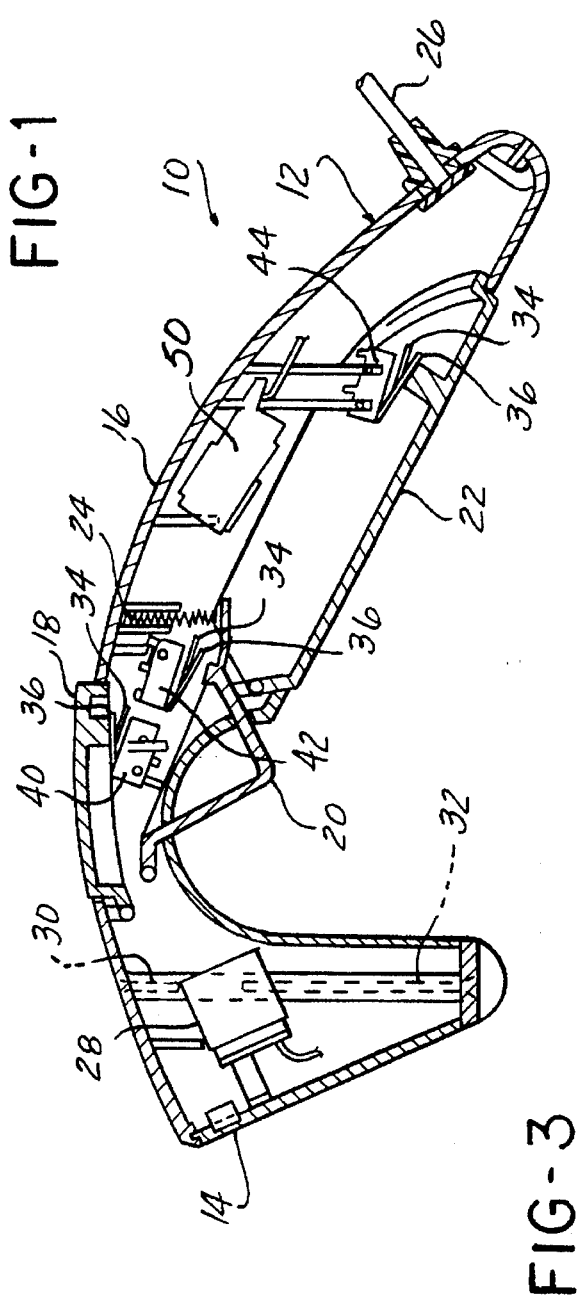

THREE-DIMENSIONAL MOUSE WITH TACTILE FEEDBACK

This application is a continuation of application Ser. No. 07/919,931, filed on Jul. 27, 1992, now U.S. Pat. No. 5,296,871.

BACKGROUND OF THE INVENTION

The present invention relates generally to mouses adapted to interface with a central processing unit, and more particularly to such a mouse which is three-dimensional and has tactile feedback.

A conventional mouse is well designed to work on a flat surface. When a person's hand rests on a flat surface at desk height, the hand automatically goes pronate. The mouse fits easily into the hollow of the palm when it is in that position. If there is more than one button on the mouse, it is easy to let the mouse rest on the table and reorient the hand to use the index finger on any button. A user rarely will use different fingers for different mouse buttons. To adapt a mouse to work in three-dimensions, "wings" have been added in one design, and another design pinches a waist into the mouse to make it easier to hold. These incremental alterations to a flat mouse do make it possible to hold in free space. However, this horizontal orientation is inappropriate and difficult to maintain. Furthermore, it is awkward to use the index, second and third fingers to activate different buttons, as this design expects. In fact, it is virtually impossible to press the third button with the third finger and maintain a constant position and orientation. Even when it is done, this takes attention, thereby breaking the user's concentration on the real task being attempted, such as analyzing a molecular docking procedure wherein the object is to minimize the binding energy of two molecules by correctly positioning and orienting one molecule with respect to another.

In addition to the physical configuration drawbacks of available devices, they generally do not have any type of tactile feedback, which could enhance positioning ability by providing energy level readings via vibrations in a docking task, or clicking when an object is penetrated in other tasks for which the mouse could be used.

One type of tactile man-machine communication system is disclosed in U.S. Pat. No. 3,919,691. In this system, a movable arm or control stick generates data regarding the three-dimensional position of the arm. A central processing unit develops a mathematical representation of the surface of an object and compares the surface representation of the object with the actual position of the arm. The CPU generates force components to alter the mobility of the arm to enable the user to probe the contents of the three-dimensional surface of the object. For example, when the probe is indicated as touching the surface of an object presented on a display, the CPU impedes further movement of the probe, thereby providing a feel of actually "touching" the surface of the displayed object. However, this reference does not disclose an input device freely movable in three dimensions, nor does it create vibrations or clicks in the movable arm which are transmitted to the user to indicate a closing approach to the object.

Thus, it is an object of the present invention to provide an ergonomic, hand contoured, comfortable to use, three-dimensional mouse. It is a further object of the present invention to provide such a mouse specifically for use in space, having a generally vertical orientation with respect to the user, following the natural position of the hand when suspended in front of a person's body. It is a further object of the present invention to provide tactile feedback in the three-dimensional mouse in order to enhance its usefulness in various applications. Still further, it is an object of the present invention to provide pressure sensors in the three-dimensional mouse to yet further enhance its usefulness as an input device.

SUMMARY OF THE INVENTION

The present invention addresses and solves all the problems enumerated above. The present invention comprises a three-dimensional mouse for interfacing with a central processing unit. The mouse comprises a hand-held housing adapted to be used in free space. The housing has a generally vertical orientation relative to the user. Means, mounted in the housing, are provided for locating the mouse with respect to at least one of spatial dimension and orientational dimension, which locating means includes means for transmitting the location to a central processing unit.

BRIEF DESCRIPTION OF THE DRAWINGS

Other objects, features and advantages of the present invention will become apparent by reference to the following detailed description and drawings, in which:

FIG. 1 is a side view of the three-dimensional mouse of the present invention, showing a user's hand in phantom;

FIG. 2 is a front view of the present invention, showing the full front of the face portion, as the face portion would be oriented relative to a computer monitor; and FIG. 3 is a cross sectional side view taken on line 3—3 in FIG. 2, and showing the invention in its non-use, table top resting position.

DETAILED DESCRIPTION OF THE PREFERRED EMBODIMENTS

Referring now to FIG. 1, the three-dimensional mouse of the present invention is designated generally as 10. Mouse 10 is for interfacing with a central processing unit (not shown). Mouse 10 comprises a hand-held housing 12 (the user's hand H is shown in phantom in FIG. 1) adapted to be used in free space. Housing 12 may have a face portion 14 and a grip portion 16, or it may have only a grip portion naturally conformed to the hand, depending upon the manufacturing capabilities/necessities and/or the configuration desired by the consumer. Housing 12 has a generally vertical orientation relative to the user, in the user's typical and resting position with the arm held out naturally in front of the body. From this generally vertical position, it is easier to move mouse 10 into any desired position and/or orientation with respect to the monitor. As shown in FIG. 1 by arrow A, housing 12 will face the monitor screen or the like of the central processing unit. When in that position, as shown in FIG. 2, mouse 10 will assume its generally vertical orientation with respect to the user.

Mouse 10 further comprises deformable means, movably disposed within the housing, for providing a variation of a physical property to be sensed. The deformable means may comprise any suitable means, but in the preferred embodiment, this means comprises a push button, and even more preferably, comprises a thumb push button 18, an index finger push button 20, and a grip push button 22. The deformation of this push button may be sensed in a variety of different ways, including, but not limited to a switching means and/or a pressure sensing means (both described further below).

Mouse 10 may further comprise a switching means, disposed within housing 12, for selectively moving an electrical contact 36 between two electrical states, wherein the electrical states are able to be sensed, and/or for sensing a physical displacement caused by the user. It is to be understood that the selective switching means may comprise any suitable means, including but not limited to, a microswitch, such as the microswitch commercially available from Cherry Electrical Products, Waukegan, Ill., under the trade designation Cherry DG1C-B3LA. In the preferred embodiment, the switching means comprises first 40, second 42 and third 44 microswitches, the first 40 being operatively connected to the thumb push button 18, the second 42 being operatively connected to the index finger push button 20, and the third 44 being operatively connected to the grip push button 22. The mouse 10 may further optionally comprise means for biasing the microswitch to an open position (each of microswitches 40, 42 and 44 are shown in the open position in FIG. 3). This biasing means may comprise any suitable means, however, in the preferred embodiment, this biasing means comprises a spring 24.

Mouse 10 may further comprises means, responsive to any of the various sensing and/or switching means described herein, for transmitting the sensed electrical state to the central processing unit. This transmitting means may comprise any suitable means including cables, electrical conductors (suitable wires, etc.), and/or air (for transmitting radio signals and the like, laser beams, infrared signals, etc.). In the preferred embodiment, the sensed state transmitting means comprises a cable 26 having any number of individual electrical conductors therein, the cable being attached at one end to housing 12, and at the other end to the central processing unit, or to intermediate electronics meant to interpret the state of various sensors into a form useful to a computer.

It is to be understood that many varied types of sensing means may be used in the present invention. Various properties sensable are listed in the 1992 SENSORS Buyer's Guide published by Helmers Publishing, Inc., Peterborough, N.H. Of these contemplated by the inventor as being particularly applicable in the present invention are acceleration, force, humidity, moisture, motion, position (angular and linear), pressure, sound, speed, strain, tactile sensors, temperature, tilt, torque, velocity, vibration, and weight. Generally, all of the sensing means discussed herein need to be interpreted by suitable electronics generally known in the art, which can be inside the housing 12, outside the housing 12 and the central processing unit, and/or inside the central processing unit. In the preferred embodiment, this electronics (not shown) is located outside of both the housing 12 and the CPU. This electronics can turn the change in electrical properties, resulting from whatever physical property sensed, into a digital signal for subsequent transmission to the computer. For example, the physical properties, such as pressure, location, etc., may be turned by a transducer into an electrical signal. The electrical signal may then be measured and turned into a digital signal. Also suitable are transducers which emit a signal, as opposed to transducers which translate signals. In the preferred embodiment, the various sensing means are changing an electrical property which can be sensed by appropriate control electronics, after feeding a signal into and through the sensing means.

Mouse 10 may further optionally comprise means, operatively connected to the push button, for sensing an amount of force applied by the user to the push button. This force sensing means may comprise any suitable means. Means, responsive to the force sensing means, are further provided for transmitting the force amount information to the central processing unit, and/or to the intermediate electronics discussed above. It is to be understood that this pressure amount transmitting means may comprise any suitable means. In the preferred embodiment, the force sensing means is a pressure sensor 34 comprising a force sensitive resistor operatively connected to the electrical contact 36 of each of the microswitches 40, 42, 44. It is to be understood that pressure sensor 34 may also be distinct from electrical contact 36, as long as it is in a position to sense any force applied to the push button. Any suitable pressure sensor may be used, including any of those commercially available from Interlink Electronics, Carpinteria, Calif., under the trade name FORCE SENSING RESISTORS, Model numbers 300B through 306C. Preferably, Model Number 301B is used. Pressure sensor 34 changes resistance, corresponding to the amount of pressure applied, and the suitable electronics discussed above produces a digital signal which is sent to the central processing unit by the transmitting means, preferably, a suitable electrical conductor. The range of pressures able to be sensed by the pressure sensor 34 may be any suitable range as desired by the manufacturer and/or consumer, however, in the preferred embodiment, the pressure range is between about zero psi and about 255 psi.

The three-dimensional mouse 10 may further comprise means, mounted in the housing, for locating the mouse 10 with respect to at least one of spatial dimension and orientational dimension, which locating means includes any suitable means for transmitting the location the computer. The locating means returns three spatial dimensions, x, y, z; and three orientational dimensions, pitch, yaw, roll. Any subset of these w six dimensions may be useful, depending upon the desired application of the mouse 10, for example 2 spatial, 1 orientational; 3 spatial, 2 orientational; 2 spatial, 0 orientational; etc., and the present invention is not to be read as limited to the requirement of all six dimensions. It is to be understood that this locating means may comprise any suitable means, such as by light, accelerometers, gyroscopes, etc. However, in the preferred embodiment, this locating means comprises an ultrasonic sensor or magnetic sensor 28 secured within face portion 14. Any suitable sensors may by used, however, in the preferred embodiment, the magnetic sensor 28 is commercially available from Ascension Technology Corp., Burlington, Vt., under the trade name The Bird 6D Input Device; or from Polhemus, A Kaiser Aerospace & Electronics Company, Colchester, Vt., under the trade name 3SPACE FASTRAK or 3SPACE ISOTRAK. The ultrasonic sensor is commercially available from Logitech Inc., Fremont, Calif., under the trade name LOGITECH 2D/6D MOUSE. Sensor 28 may be secured within face portion 14 by any suitable means, such as by any suitable adhesive or the like. The housing 12 may be held together by screws 30, 32. If the ultrasonic sensor is used, microphones 38 are utilized. It is to be understood that the magnetic sensor 28 or the ultrasonic sensor (with associated microphones 38) may be used, either alone or in combination. If both the ultrasonic sensor and the magnetic sensor are used (or any combination of two or more different types of sensors sensing the position and/or orientation of the mouse), the mouse 10 will get much more information, thereby allowing the computer to give a more accurate representation of the position and/or orientation of the mouse 10.

Means, mounted in the housing and responsive to the central processing unit, are provided for imparting tactile feedback to a user based on the position of the locating means with respect to the type and position of data on a monitor or any other suitable type of central processing unit display. This tactile feedback imparting means may comprise any suitable means, however, in the preferred embodiment, this means comprises a vibrator 50 either totally contained within housing 12, or partially exposed outside of housing 12. As shown in FIG. 3, vibrator 50 is secured within grip portion 16 adjacent the user's palm P or thenar eminence.

The mouse 10 interfaces with a central processing unit which contains data representing the three-dimensional position of an object, whether in free space, or simulated on a display. A computer compares the actual position and orientation of the mouse with the object and generates tactile feedback in the form of vibrations or clicks in the mouse which can be felt by the user, with the frequency, form or amplitude of the vibrations or clicks varying. They may, for instance, increase as the mouse 10 is moved closer to a surface or point on the object. Among many applications, the invention 10 has application in molecular docking to correctly position and orient one molecule with respect to another. In this application, the computer controls the vibrations and/or clicks on the mouse 10 as the user manipulates the mouse 10 to position one molecule with respect to another in a molecular chain to locate the best binding configuration by tactile feel. For example, the vibrations will vary depending upon the position and the type of molecule, functional group and/or radical one desires to bind to another molecule.

While preferred embodiments of the invention have been described in detail, it will be apparent to those skilled+in the art that the disclosed embodiments may be modified and that, as a general purpose display of information to the user, the invention's applications are not limited to those mentioned above. Therefore, the foregoing description is to be considered exemplary rather than limiting, and the true scope of the invention is that defined in the following claims.

What is claimed

1. A three-dimensional, user interactive mouse for interfacing with a central processing unit, the mouse comprising:
   a hand-held housing substantially contoured to the user's hand when in a gripping position, the housing adapted to be used in free space and having a generally vertical orientation relative to a user;
   means, mounted in the housing, for locating the mouse in free space, which locating means includes means for transmitting the location to the central processing unit; and
   ambidextrous deformable means, movably disposed within the housing, for providing a variation of a physical property to be sensed, wherein the deformable means comprises a thumb push button, an index finger push button, and a grip push button, each of the thumb, index finger and grip push buttons positioned on the housing at a respective location adjacent the natural placement of the user's thumb, index finger and grip when held in front of the user by either a right or a left hand.

2. The three-dimensional mouse as defined in claim 1, further comprising:
   a microswitch, operatively connected to at least one of the push buttons, for sensing a physical displacement caused by the user; and
   means, responsive to the microswitch, for transmitting the physical displacement information to the central processing unit.

3. The three-dimensional mouse as defined in claim 1 wherein the locating means is at least one of a magnetic sensor, an ultrasonic sensor, light modulation, an accelerometer, and a gyroscope.

4. The three-dimensional mouse as defined in claim 1, further comprising:
   means, operatively connected to at least one of the push buttons, for sensing an amount of force applied by the user; and
   means, responsive to the force sensing means, for transmitting the force amount information to at least one of intermediate interpreting electronics and a central processing unit.

5. The three-dimensional mouse as defined in claim 4 wherein the amount of force able to be sensed by the force sensing means ranges between about 0 psi and about 255 psi.

6. The three-dimensional mouse as defined in claim 1, further comprising:
   means, mounted in the housing and responsive to a central processing unit, for imparting tactile feedback to a user based on the position of the locating means with respect to the type and position of data on a central processing unit display.

7. The three-dimensional mouse as defined in claim 6 wherein the tactile feedback imparting means is a vibrator secured within the housing.

8. The three-dimensional mouse as defined in claim 1, further comprising:
   means, operatively connected to the deformable means, for sensing an amount of force applied by the user; and
   means, responsive to the force sensing means, for transmitting the force amount information to at least one of intermediate interpreting electronics and a central processing unit.

9. The three-dimensional mouse as defined in claim 8 wherein the force sensing means is a pressure sensor comprising a force sensitive resistor.

10. A three-dimensional, user interactive mouse for interfacing with a central processing unit, the mouse comprising:
    a hand-held housing substantially contoured to the user's hand when in a gripping position, the housing adapted to be used in free space and having a generally vertical orientation relative to a user;
    ambidextrous deformable means, movably disposed within the housing, for providing a variation of a physical property to be sensed, wherein the deformable means comprises a thumb push button, an index finger push button, and a grip push button, each of the thumb, index finger and grip push buttons positioned on the housing at a respective location adjacent the natural placement of the user's thumb, index finger and grip when held in front of the user by either a right or a left hand; and
    at least one of an ultrasonic sensor and a magnetic sensor secured within the housing, for locating the mouse with respect to at least one of spatial dimension and orientational dimension, which locating means includes means for transmitting the location to the central processing unit.

11. The three-dimensional mouse as defined in claim 10, further comprising:
    a pressure sensor comprising a force sensitive resistor, operatively connected to each of the push buttons, for sensing an amount of force applied; and
    means, responsive to the pressure sensor, for transmitting the force amount information to at least one of intermediate interpreting electronics and the central processing unit.

12. The three-dimensional mouse as defined in claim 10, further comprising:

a vibrator secured within the housing and responsive to the central processing unit, for imparting tactile feedback to a user based on the position of the locating sensor with respect to the type and position of data on a central processing unit display.

* * * * *